United States Patent
Hopkins et al.

(10) Patent No.: US 6,687,485 B2
(45) Date of Patent: Feb. 3, 2004

(54) SYSTEM AND METHOD FOR PROVIDING HELP/TRAINING CONTENT FOR A WEB-BASED APPLICATION

(75) Inventors: Rosalie Marie Hopkins, Norcross, GA (US); Sarah Elizabeth Chodrow, Decatur, GA (US); Kevin Rory Danner, Suwanee, GA (US)

(73) Assignee: Thinksmark Performance Systems LLC, Norcross, GA (US)

( * ) Notice: Subject to any disclaimer, the term of this patent is extended or adjusted under 35 U.S.C. 154(b) by 0 days.

(21) Appl. No.: 10/151,256

(22) Filed: May 21, 2002

(65) Prior Publication Data

US 2003/0219707 A1 Nov. 27, 2003

(51) Int. Cl.[7] .................................................. G09B 3/00
(52) U.S. Cl. .................... 434/350; 434/322; 434/307 R; 434/118; 345/705; 345/708; 717/124; 717/143
(58) Field of Search ................................. 434/350, 323, 434/318, 307 R; 703/22; 717/124, 143; 345/705, 708

(56) References Cited

U.S. PATENT DOCUMENTS

| | | |
|---|---|---|
| 5,442,759 A | 8/1995 | Chiang et al. |
| 5,535,422 A | 7/1996 | Chiang et al. |
| 5,597,312 A | 1/1997 | Bloom et al. |
| 5,627,958 A | 5/1997 | Potts et al. |
| 5,754,176 A | 5/1998 | Crawford |
| 5,760,771 A | 6/1998 | Blonder et al. |
| 5,823,781 A | 10/1998 | Hitchcock et al. |
| 5,877,757 A | 3/1999 | Baldwin et al. |
| 6,000,945 A | 12/1999 | Sanchez-Lazer et al. |

(List continued on next page.)

OTHER PUBLICATIONS

Granger, David V., Online Help Trends, Apr. 2001, Fore-Front, Inc., pp. 4–6.*
PCT–International Search Report date Jul. 24, 2003 for application No. PCT/US03/15204.
Granger, "Online Help Trends," Apr. 2001, Forefront Incorporated, pp. 1–7.
BAYDON SOLUTIONS, "Product Overview", 4 pages. (www.baydon–solutions.com).
EPIANCE, "EPIplex", 17 pages. (www.epiance.com).
STERLING RESOURCES, "Products", 3 pages. (www.sterlingnet.com).
GLOBAL KNOWLEDGE, "IT Education & Training Solutions", 4 pages, (www.globalknowledge.com).
EPIC INTERACTIVE TECHNOLOGIES, INC., "About Us", 4 pages. (www.epicinteractive.com).
E–GLUE SOFTWARE TECHNOLOGIES, "FAI Customers support", 10 pages. (www.e–glue.com).
NEURAL SOLUTIONS, "Wisdom for Notes DevPack", 6 pages. (www.neuralsolutions.com).
EGUIDESTORE, "Products", 3 pages. (www.eguidestore.com).

*Primary Examiner*—S. Thomas Hughes
*Assistant Examiner*—John Sotomayor
(74) *Attorney, Agent, or Firm*—Hunton & Williams LLP

(57) ABSTRACT

A system and method of the present invention supplies a user of a web-based application with relevant interactive help/training content that corresponds to an object or page of the web-based application that the user's cursor is pointing to. The help/training content may include instructions, policies, procedures, tips and other information that may be dynamically updated and delivered to the user. The relevant help/training content may be displayed in a separate browser window where general information related to a page or pages as well as specific information related to a particular object may be provided.

24 Claims, 11 Drawing Sheets

U.S. PATENT DOCUMENTS

| | | |
|---|---|---|
| 6,005,569 A | 12/1999 | Breggin |
| 6,014,134 A | 1/2000 | Bell et al. |
| 6,020,886 A | 2/2000 | Jacober et al. |
| 6,067,538 A | 5/2000 | Zorba et al. |
| 6,149,441 A * | 11/2000 | Pellegrino et al. .......... 434/350 |
| 6,208,338 B1 | 3/2001 | Fischer et al. |
| 6,219,047 B1 | 4/2001 | Bell |
| 6,297,822 B1 | 10/2001 | Feldman |
| 6,300,950 B1 | 10/2001 | Clark et al. |
| 6,308,042 B1 | 10/2001 | Marsh et al. |
| 6,339,436 B1 | 1/2002 | Amro et al. |
| 6,340,977 B1 | 1/2002 | Lui et al. |
| 6,347,333 B2 * | 2/2002 | Eisendrath et al. ......... 709/217 |
| 6,347,943 B1 | 2/2002 | Fields et al. |
| 6,358,053 B1 * | 3/2002 | Rosenfield et al. ......... 434/156 |
| 6,413,100 B1 * | 7/2002 | Dickmeyer et al. ......... 434/322 |
| 6,438,353 B1 * | 8/2002 | Casey-Cholakis et al. .. 434/350 |
| 6,442,714 B1 * | 8/2002 | Griffin et al. ................. 714/46 |
| 2002/0014056 A1 | 2/2002 | Weinlaender |
| 2002/0031751 A1 | 3/2002 | Wen et al. |

\* cited by examiner

Link Objects

| Page | DB | Action | URL |
|---|---|---|---|
| Y | Y | Nothing ⌄ | http://www.abc_provider.com/default/ |
| Y | Y | Nothing ⌄ | http://www.abc_provider.com/About/ |
| Y | Y | Nothing ⌄ | http://www.abc_provider.com/About/ |
| Y | Y | Nothing ⌄ | http://www.abc_provider.com/About/ |
| Y | Y | Nothing ⌄ | http://www.abc_provider.com/Course/ |
| Y | Y | Nothing ⌄ | http://www.abc_provider.com/Course/ |
| Y | Y | Nothing ⌄ | http://www.abc_provider.com/Service |
| Y | Y | Nothing ⌄ | http://www.abc_provider.com/Service |
| Y | Y | Nothing ⌄ | http://www.abc_provider.com/default/ |
| Y | Y | Nothing ⌄ | http://www.abc_provider.com/Service |
| Y | Y | Nothing ⌄ | http://www.abc_provider.com/default/ |
| Y | Y | Nothing ⌄ | http://www.abc_provider.com/Course/ |
| Y | Y | Nothing ⌄ | http://www.abc_provider.com/Course/ |
| Y | Y | Nothing ⌄ | http://www.abc_provider.com/Service |
| Y | Y | Nothing ⌄ | http://www.abc_provider.com/default/ |
| Y | Y | Nothing ⌄ | http://www.abc_provider.com/default/ |

Admin
General: Update - Tabs
Current: Page - Links - Forms
Find: EPSS - Pages - Links - Forms - Fields

Figure 10

SYSTEM AND METHOD FOR PROVIDING HELP/TRAINING CONTENT FOR A WEB-BASED APPLICATION

FIELD OF THE INVENTION

The present invention relates to providing help/training content for a web-based application, and is particularly concerned with simultaneously displaying customizable, interactive help/training content in a browser window for an object of a web-based application as the object is triggered in another browser window supporting the web-based application.

Computer-related applications have become increasingly sophisticated and easily accessible over the Internet. As technology advances, new versions and improvements are released periodically with increased frequency. Service providers and other entities are offering more and more applications over the Internet which are easily accessible to all types of users around the world.

With new technology and improved versions of software, users need instructions and oftentimes structured training classes to utilize certain applications effectively. While some applications provide a help module, traditional help programs generally offer static help content that must be requested by the user. Oftentimes, an answer to a particular problem may be difficult to locate, requiring time and effort. In addition, traditional help tools are integrated into a particular piece of software (or application) thereby requiring separate help tools for each new piece of software, including upgrades. As a result, the help/training tool itself becomes obsolete with each new upgrade.

Most companies will provide classroom instruction (e.g., training courses) to introduce a new application or updated version of a familiar application for their employees. Training courses may last a few hours to several days to instruct new users on how to perform daily tasks. Similarly, newly hired employees will also need training for software. Even if a new employee is familiar with a particular application, the new employee will still need to be trained on company policies, procedures and other protocols that may be specific to an employer. The new employee might have a personal instructor stepping through the operation of the computer program, providing the new employee with the policies and procedures for performing tasks (e.g., entering data). However, a personal instructor for each new employee is expensive and time consuming. One way to save costs is to provide training courses periodically (e.g., monthly, quarterly, or semi-annually) for a group of new employees or new users. However, if a new employee is hired during the beginning of this period, the new employee will be unproductive for most of this period until the training course is offered. While training courses are a common way to provide instructions to users, lost production attributed to the company may be enormous and very costly to the company.

In addition, various users have different proficiency levels. While some users may only need a few hours of training to be productive, others may require several days. To offer the same training course to users of varying proficiency results in wasted resources, loss of productivity, and overall frustration.

While companies are one group of users who have a need for an improved training tool, any user may run into difficulties when accessing applications over the Internet. In particular, certain government related forms are difficult to complete correctly and oftentimes require explanation. Frustrated users may give up and be forced to resort to less efficient methods for accessing information.

These and other drawbacks exist with current systems.

SUMMARY OF THE INVENTION

The present invention is directed to a software solution for web-based training. The present invention provides help/training content, which may include instructions, policies and procedures, and other general and/or customized information to a user while the user is accessing a web-based application system (e.g., PeopleSoft®, SAP®, etc.) delivered using Hypertext Markup Language (HTML), Extensible Markup Language (XML), or any tag-based language. Help/training content may refer to any information or message to be displayed with the web-based application.

The information provided to the user may be context-sensitive, showing the appropriate information at the appropriate time (e.g., when the user needs the information). As the user moves a cursor or mouse pointer over an object of an application in one application window, the help/training content associated with the object is displayed in another window viewable by the user. The relevant help/training content may be associated with a particular object of the application so that even if the object is later repositioned, altered in size or shape or otherwise modified, the relevant help/training content will be nevertheless displayed to the user when the object is triggered (e.g., by moving a cursor over the object). Thus, in this example, the help/training content is not pixel-based, but rather defined at an object level. In another embodiment, the help/training content may be displayed depending on a location of an object as well. In addition, the help/training content provided to the user may be based on a particular page (or pages) of the web-based application. Further, help/training content may also be applied to the entire web-based application.

According to another embodiment of the present invention, the user is not required to request help/training content for certain objects or fields within an application. Rather, appropriate help/training content may be automatically provided to the user as the user triggers certain objects or fields (e.g., by moving a pointer or cursor over the object or field within the page of the web-based application using a mouse or other device). Therefore, the user is not required to invoke a help/training tool, nor is the user required to search through a table of contents or submit terms for a word search. For example, for topics familiar to a user, a quick scan of the relevant help/training content may be sufficient. However, for unfamiliar topics of areas that may need further explanation, a user may examine the relevant help/training content in greater detail. In addition, additional links and/or tabs of additional information may be explored. Thus, the user may proceed through an application at his or her own pace with an amount of help/training content sufficient for the individual user.

The help/training tool of the present invention may be separate from the web-based application so that the application as viewed by the end user does not appear altered or modified. In addition, the help/training tool may work with a variety of different applications. For example, help/training content associated with an object across multiple applications may be displayed to a user. If a user is running multiple applications concurrently, the help/training tool of the present invention may display relevant help/training content for multiple applications depending on where the user's cursor is currently located (e.g., over what object in what application). For example, as a user navigates through a browser, the content displayed in a content window may change accordingly. In another example, multiple browser windows may support multiple web-based applications. While a user may be positioned in a first browser window. The content shown in the content window may change as the user toggles among different browser windows supporting different applications.

The present invention may be utilized by companies, software vendors, and other entities. For example, the application may be used with in-house and vendor-delivered systems. The present invention may by used by software vendors to provide general training for their applications. In addition, consultants may provide custom training to the vendors' end-users. However, no cooperation from a software vendor may be required for tag-based, web-delivered packages, for example. Therefore, end-user companies may work with the present invention with little or no assistance from the original software vendor. The present invention may also be used to provide consulting, implementation, and training on how to develop customized help/training content.

According to an embodiment of the present invention, a web-based Electronic Performance Support System (EPSS), running on Linux, Windows NT™ or other operating systems may be provided. The present invention may implement a combination of a proxy server, database server, and a Web server to deliver help/training content to a user simultaneously with the web-based application. One embodiment of the present invention comprises a network-based (e.g., Internet, Intranet, etc.) tool that takes an application in a tag-based language, such as HTML, XML, or other language and instruments it with on-line, interactive, help/training content.

According to another embodiment of the present invention, a content management window enables a content developer (or other user) to develop help/training content and insert the content into a database. For example, a content developer (or other user) may create content and associate the content with objects (e.g., input fields, buttons, lists, links, etc.) in a web-based application. The content management window may run with the application or without the application. For example, when new content is being created for an application, the application may run while content is being associated with tagged objects. In another example, if a minor correction is being performed, an edit may be performed to the content without running the application.

According to an embodiment of the present invention, a system for accessing help/training content associated with a web-based application comprises a first browser window for supporting the web-based application; a help/training tool associated with the web-based application; a user device (e.g., a mouse or a cursor) for triggering at least one predetermined object in the web-based application wherein the at least one predetermined object has an associated help/training content; and a second browser window for simultaneously viewing the associated help/training content for a triggered object.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings, in which:

FIG. 10 is an example of a link objects window, according to an embodiment of the present invention.

DETAILED DESCRIPTION OF THE INVENTION

The following description is intended to convey a thorough understanding of the invention by providing a number of specific embodiments and details involving a system and method for providing help/training content for a web-based application. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
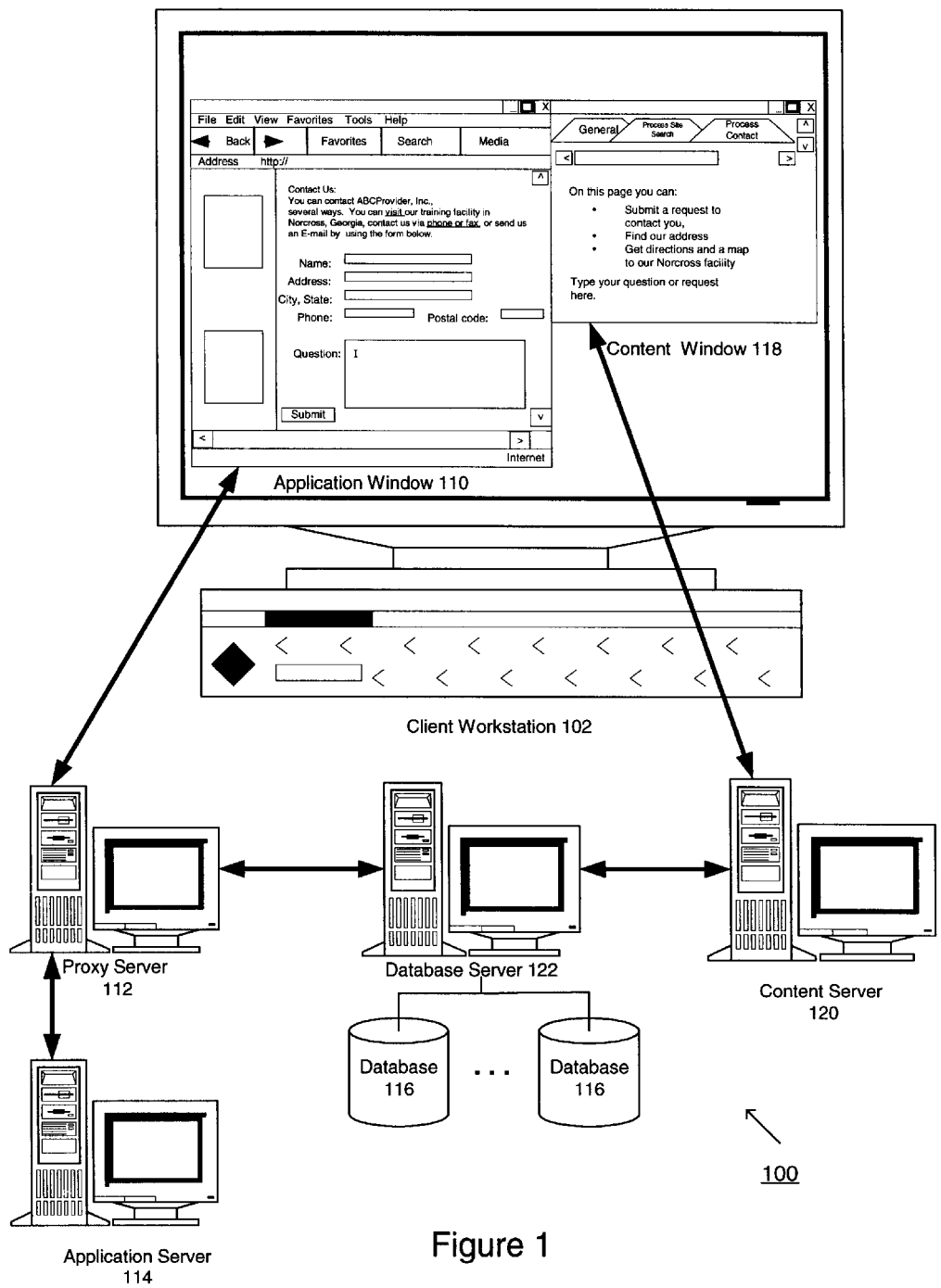
FIG. 1 illustrates a system for providing help/training content for a web-based application, according to an embodiment of the present invention.

FIG. 1 illustrates a system for providing help/training content for a web-based application, according to an embodiment of the present invention. System 100 may include a client browser for displaying an application window 110 that supports a web-based application which may be accessed over the Internet or a company's Intranet (or other network). The application may be developed using JAVA, PHP, HTML, XML, mySQL, javascript, ActiveX and/or any other language. Application window 110 may be in communication with a proxy server 112. Proxy server 112 may be in communication with an application server 114 and a database server 122. Database server 122 may manage and maintain database 116, which may include a plurality of databases where the plurality of databases may be located at a single location or multiple locations. While having access to application window 110, a user may simultaneously view help/training content on a content window 118. Content window 118 may be in communication with a content server 120, which may be in communication with database server 122. While the servers are illustrated as being separate, the functionality associated with each server may be combined. For example, functionality associated with the servers shown in FIG. 1 may be combined into one server or multiple servers, which may reside at a single location or multiple locations.

Application window 110 and content window 118 may be supported by a client workstation 102, such as any desktop device, computer, personal digital assistant (PDA) or other device capable of accessing the Internet or a company's Intranet (or other network), including wireless/mobile devices. According to an example, the application window and the content window may be displayed on a single device. In another example, while an application is running on application window 110, content window 118 may be displayed on a separate device, e.g., another computer, PDA, a mobile device, or other device capable of communication via the Internet, for example. In another example, content delivered via content window 118 may include sound, animation, graphics and/or other user interfaces. For example, content window 118 may provide content information with sound where content information may be heard by the user.

Proxy server 112 may function as an engine to enable the display of developed training, side by side with the application. Proxy server 112 allows an application to be enhanced with help/training content identifiers, while leaving the functionality of the application intact. Application server 114 delivers the application (e.g., an application page) for display by a client browser to the user.

According to an embodiment of the present invention, content window 118 may display content associated with a page, object, or other element triggered in an application supported by application window 110. According to another embodiment of the present invention, content window 118 may enable a content developer (or other user) to store objects in a database as well as associate content with those objects. This function may be performed while running an application or without running an application.

Content server 120 may supply the user with help/training content, which may include instructions, policies, procedures and/or other information that may be delivered in a tag-based language, such as HTML, XML, format or via a Uniform Resource Locator (URL) link through a browser window, for example. Content server 120 may retrieve help/training content (and/or other information) from database 116, through database server 122, and send the content to the content window 118 where it may be displayed to the user. Help/training content may contain HTML, Graphics, Flash™ movies, CBT and/or anything that may be linked to and called from HTML (or other tag-based languages).

Content window 118 allows content developers (and/or other users) to insert help/training materials (and/or other information) into database 116, through database server 122. The content window 118 may allow help/training content developers (and/or other users) to create training objects and associate them with mousable items on a screen (e.g., input fields, buttons, lists, links, etc.).

Database server 122 may hold one or more Structured Query Language (SQL) database, relational database or other type of database, as represented by database 116. A database server 122 may store help/training content (and/or other information) and associated objects. Database server 122 may save content created by content window 118.

Figure 2:
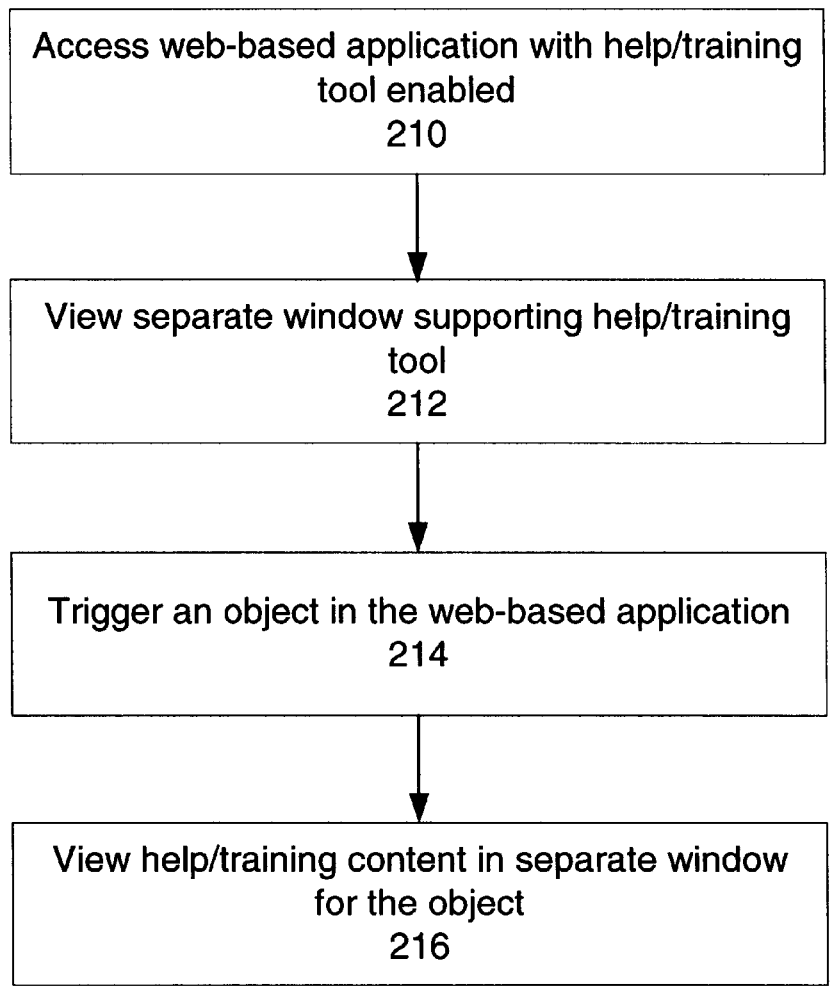
FIG. 2 is a flowchart for accessing help/training content for a web-based application from a user's perspective, according to an embodiment of the present invention.

FIG. 2 is a flowchart for accessing help/training content for a web-based application from a user's perspective, according to an embodiment of the present invention. At step 210, a user may access a web-based application via the Internet or a company's Intranet (or other network) with the help/training tool enabled. The application may be delivered using HTML, XML or another language that utilizes tags. At step 212, a separate window for displaying interactive help/training content provided by the help/training tool of the present invention may be provided to the user. At step 214, the user may maneuver a mouse pointer, cursor, or other device over various objects (e.g., fields, data input, graphics, links, etc.) of the web-based application. By moving a mouse pointer over a particular object, the help/training tool may simultaneously display corresponding help/training content associated with the particular object in the separate window, at step 216. Other methods for triggering or invoking an object of the web-based application may be implemented. Therefore, rather than requiring the user to request specific help/training content, the present invention tracks the user's actions (e.g., by a cursor, mouse or other pointer) and simultaneously provides relevant help/training content.

Figure 3:
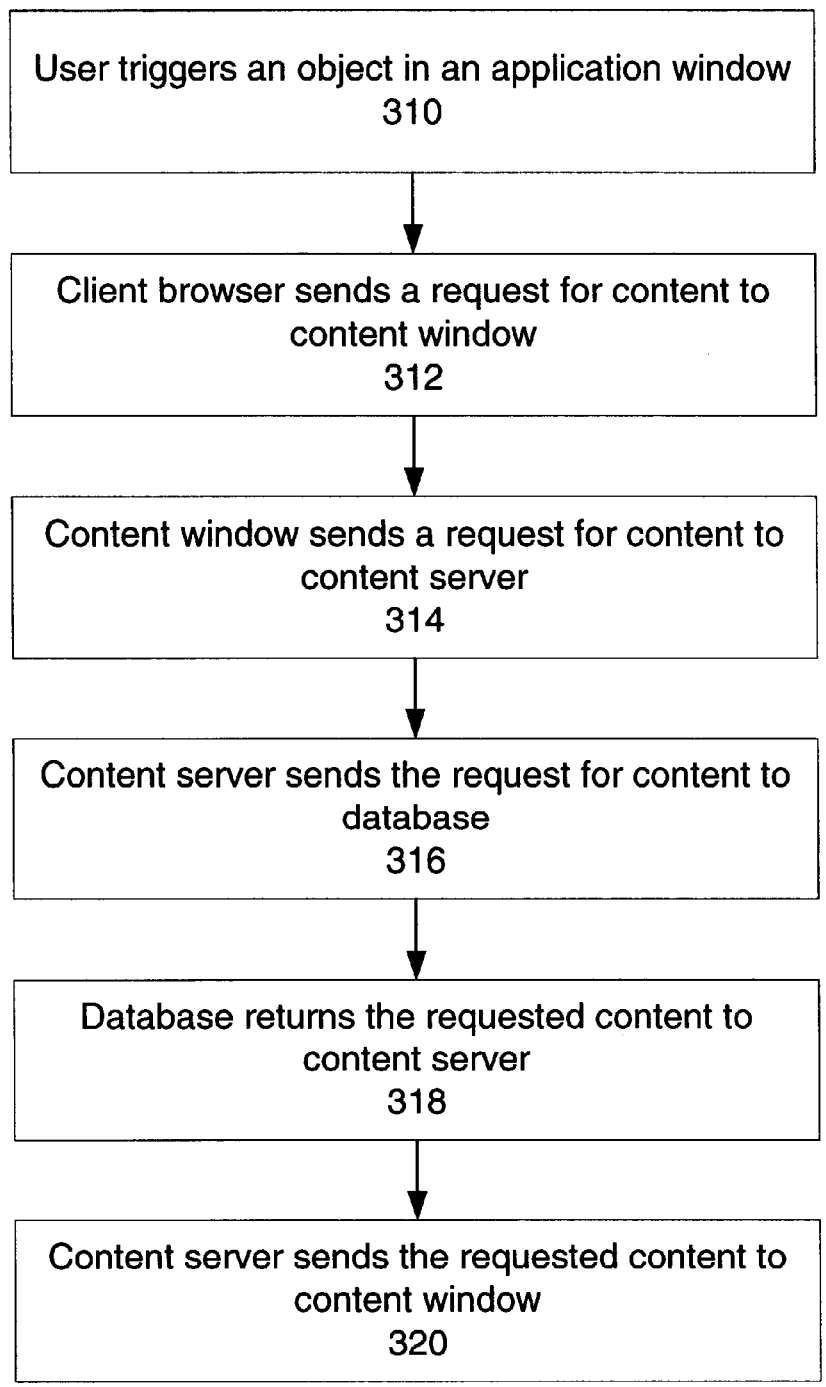
FIG. 3 is a flowchart illustrating a help/training content request process, according to an embodiment of the present invention.

FIG. 3 is a flowchart illustrating a help/training content request process, according to an embodiment of the present invention. At step 310, a user may trigger an object (e.g., input field, button, drop-down, link, etc.) in an application window, supported by a client browser. For example, a user may move a mouse in an object window or a user may position a cursor over an object or word. Other methods for activating an object may be implemented. At step 312, the client browser may send a request for content (e.g., a help/training content identifier) to a content window. At step 314, the content window may send the request for content to a content server. At step 316, the content server may send the request for content to a database server. At step 318, the database server may return the requested content (e.g., training content associated with the triggered object) to the content server. At step 320, the content server may send the requested content to the content window for simultaneous display with the application window.

Figure 4:
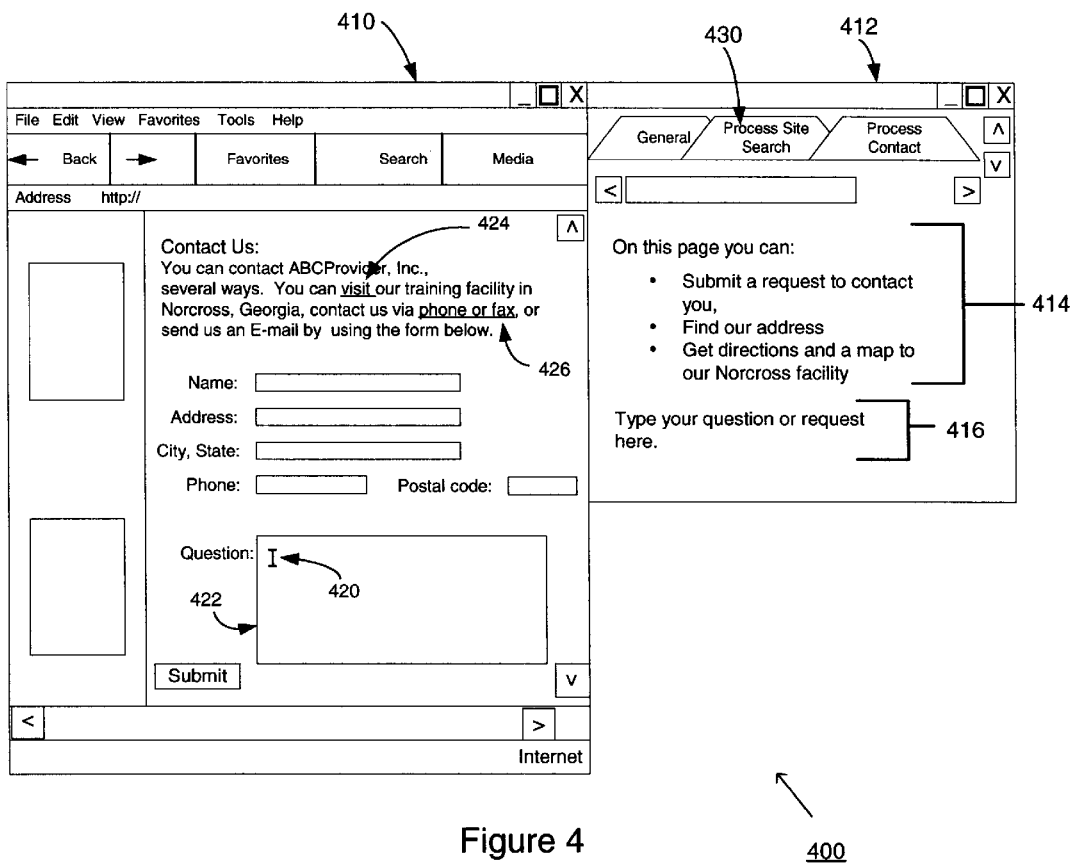
FIG. 4 is an example of an application window and a content window, according to an embodiment of the present invention.

FIG. 4 is an example of an application window and a content window, according to an embodiment of the present invention. Application window 410 may display a web-based application that may be accessed by a URL (or other identifier or address). Content window 412 may display help/training content associated with the page displayed in Application window 410. Content window 412 may provide general information associated with the page, as shown by 414, as well as specific information related to a particular object, as shown by 416. As the user moves a cursor (or other pointer) around the page, content window 412 may display help/training content corresponding to an object to which the cursor is currently pointing. For example, cursor 420 is shown in Question box 422. Accordingly, help/training content associated with Question box 422 is displayed in content window 412, at 416. Content window 412 may display available options, functions, instructions, policies and/or other information associated with the corresponding object or page in the Application window 410. As the user moves cursor 420 to a different object, the content in window 412 may change to correspond to that object.

Help/training content may also be displayed for hyperlinks and other objects. For example, when cursor 420 points to hyperlinks "visit" 424 or "phone or fax" 426, content window 412 may display corresponding information related to these hyperlinks.

Content window 412 may also provide interactive content. For example, various tabs, as shown by 430, may be available to provide additional or more detailed information. For example, tabs 430 may provide content such as process descriptions, useful links, policies, etc. These tabs may be customized to deliver easily accessible information that may be updated dynamically in real time.

According to another embodiment of the present invention, the help/training tool of the present invention enables users to create content dynamically for various objects and/or pages of a web-based application.

Figure 5:
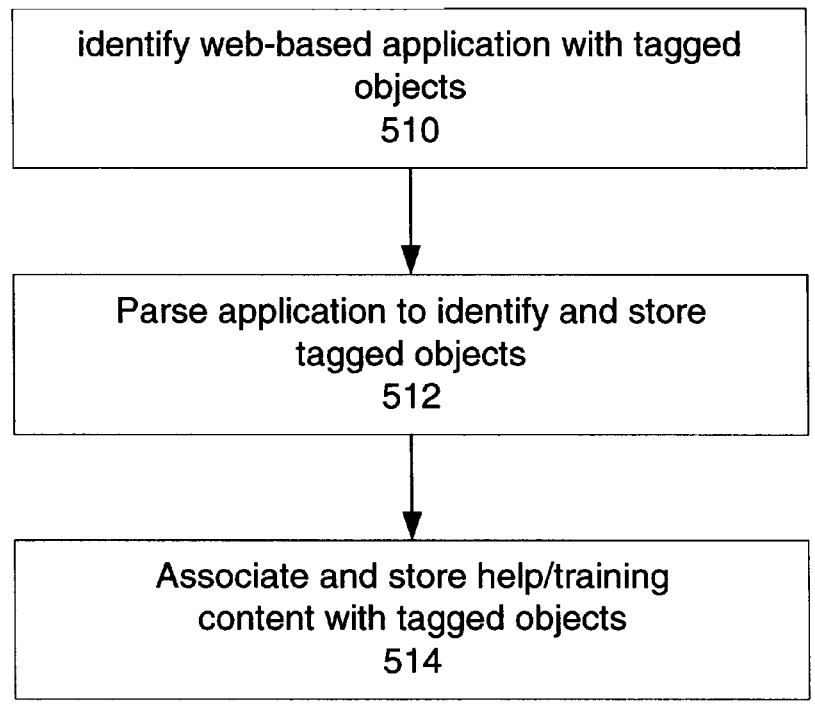
FIG. 5 is a flowchart illustrating management of help/training content for a web-based application, according to an embodiment of the present invention.

FIG. 5 is a flowchart illustrating management of help/training content for a web-based application, according to an embodiment of the present invention. At step 510, a web-based application may be identified and/or accessed. The web-based application may generally contain various objects (e.g., elements, tags or other identifiers). The web-based application may be delivered using HTML, XML, or another tag-based language. Help/training content may be stored and associated with particular tags. When the tag is triggered, the associated help/training content may be displayed. Since help/training content may be associated with a particular tag in the application, even if an object (e.g., an input box) is moved to a different location, the appropriate help/training content still may be displayed. For example, moving the cursor to an object may generate an event that calls an appropriate help function. At step 512, the web-based application may be parsed to identify tagged objects and store object identifiers in the database, as shown in further detail in connection with FIGS. 9, 10, and 11. At step 514, help/training content may be associated with the identified object identifiers and stored in the database. Help/training content may include instructions, explanations, tips, policies, protocols and/or other information relevant to a particular object, group of objects, page, or pages of the web-based application. The help/training content may be displayed to a user when an associated object in the web-based application is triggered. According to the present invention, the functionality of the web-based application itself is not compromised or modified. Furthermore, the application is not required to change to make use of the present invention.

Figure 6:
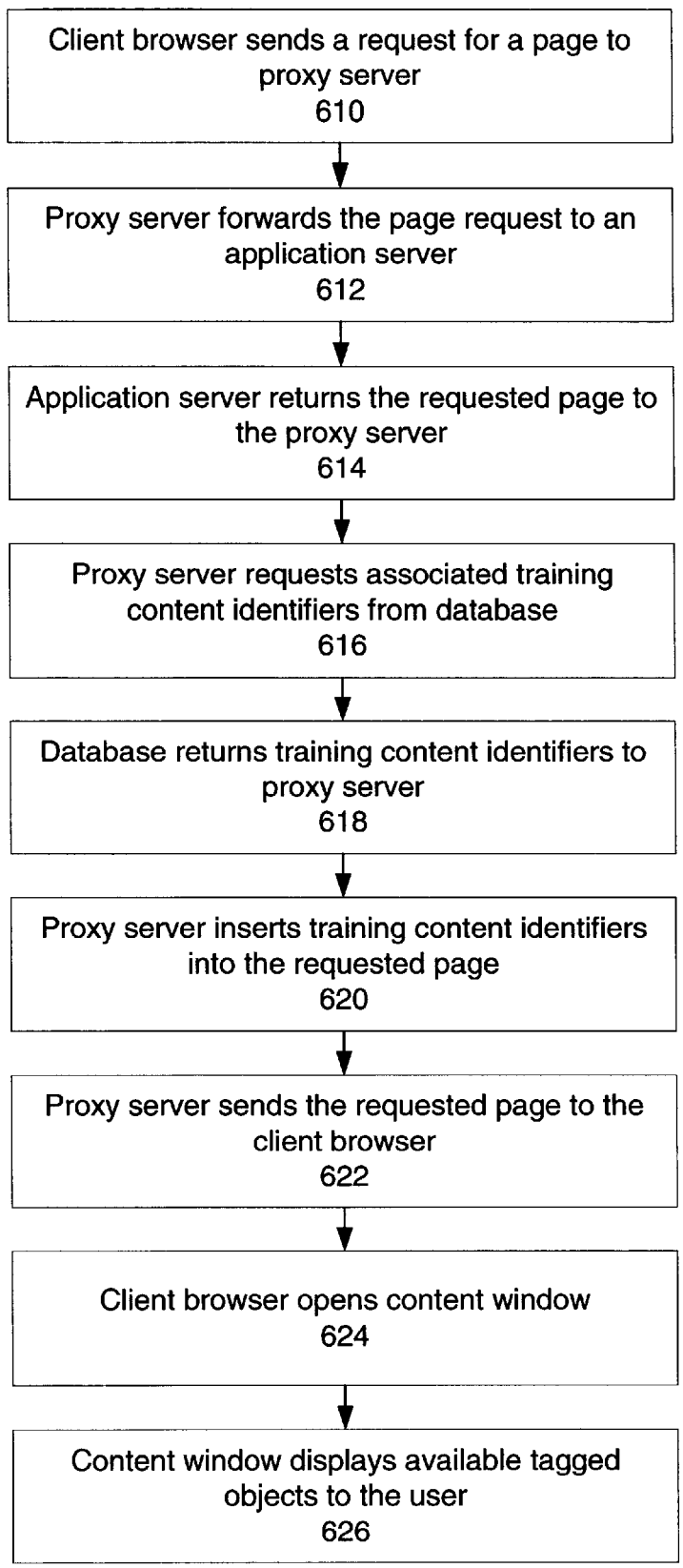
FIG. 6 is a flowchart illustrating a content management process, by which tagged objects are presented to a user, according to an embodiment of the present invention.

FIG. 6 is a flowchart illustrating a content management process, by which tagged objects may be presented to a user, according to an embodiment of the present invention. An application may be run through a proxy server so that a content window may detect tagged objects. The present invention may allow a content developer to store the tagged objects in a database. At step 610, a client browser may send a request for an application page to a proxy server. At step 612, the proxy server may forward the page request to an application server. At step 614, the application server may return the requested page to the proxy server. At step 616, the proxy server may request help/training content identifiers associated with the requested page from a database server. At step 618, the database server may return the help/training content identifiers to the proxy server. At step 620, the proxy server may annotate the requested page with help/training content identifiers. At step 622, the proxy server may send the annotated page to the client browser. At step 624, the client browser may open a content window. At step 626, the content window may display available tagged objects to the user.

Figure 7:
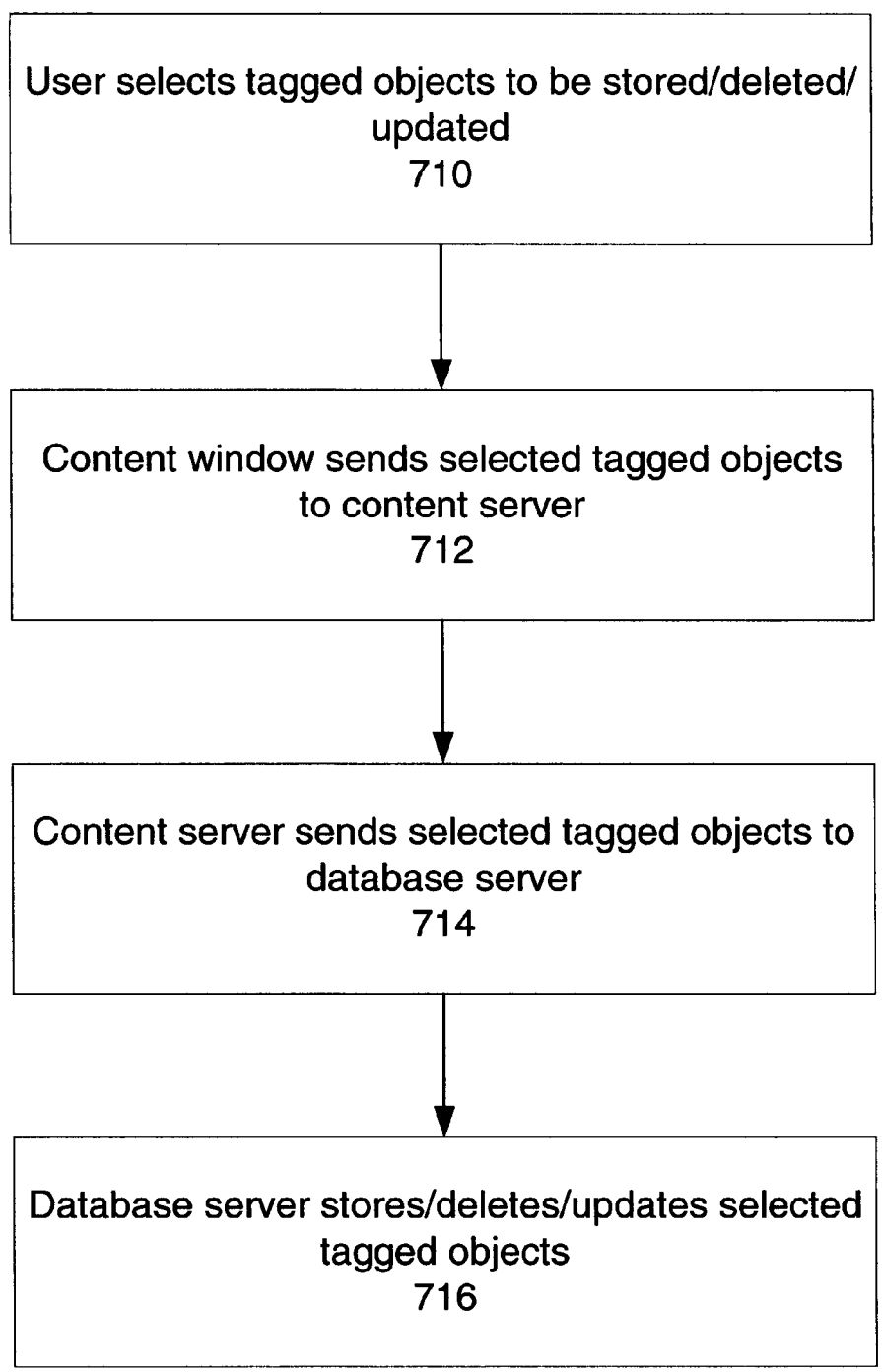
FIG. 7 is a flowchart illustrating actions that may be taken with tagged objects relevant to a help/training system, according to an embodiment of the present invention.

FIG. 7 is a flowchart illustrating actions that may be taken with tagged objects relevant to a help/training system, according to an embodiment of the present invention. At step 710, a user may select one or more tagged objects to be stored, deleted and/or updated. Other user-defined or user-selected actions may be performed. At step 712, a content window may send one or more selected, tagged objects to a content server. At step 714, the content server may send one or more selected, tagged objects to a database server. At step 716, the database server may store, delete and/or update one or more selected, tagged objects. Other actions requested by the user may be performed.

The content window may run with the application or without the application. For example, when new content is being created for an application, the application may run while content is being associated with tagged objects. In another example, if a minor correction is being performed (e.g., a one-word correction), an edit may be performed to the content without running the application.

Figure 8:
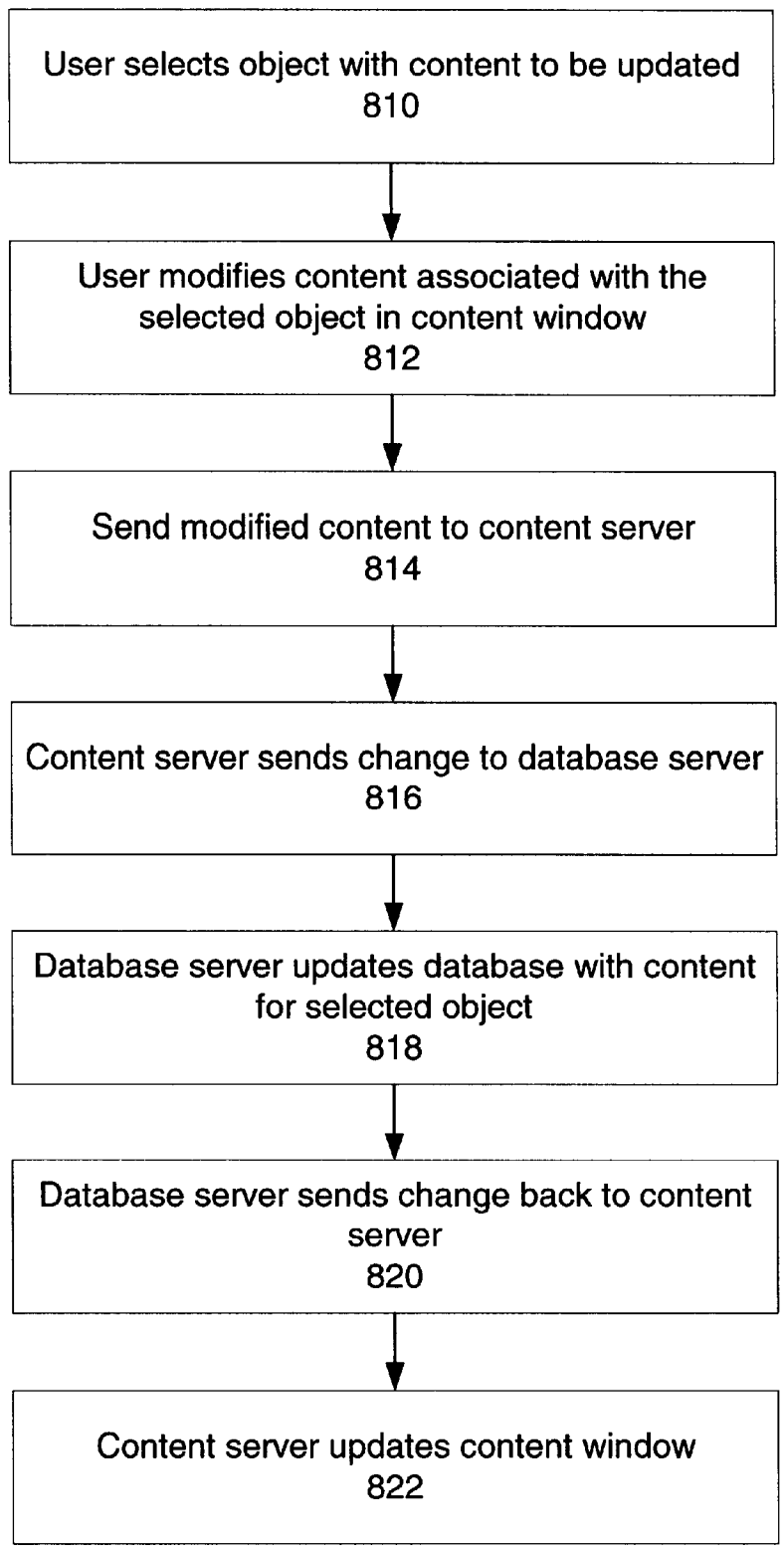
FIG. 8 is a flowchart illustrating a content management process by which content may be associated with selected objects, according to an embodiment of the present invention.

FIG. 8 is a flowchart illustrating a content management process by which content is associated with selected objects, according to an embodiment of the present invention. At step 810, a user may select an object with content to be updated. Other user-defined or user-selected actions may be performed. At step 812, the user may modify (e.g., add, update, or delete) the content associated with the selected object in the content window. At step 814, the modified content may be sent to a content server. At step 816, the content server may send the change to a database server. At step 818, the database server may update the database with content for the selected object. At step 820, the database server may send the change back to the content server. At step 822, the content server may update the content window.

Figure 9:
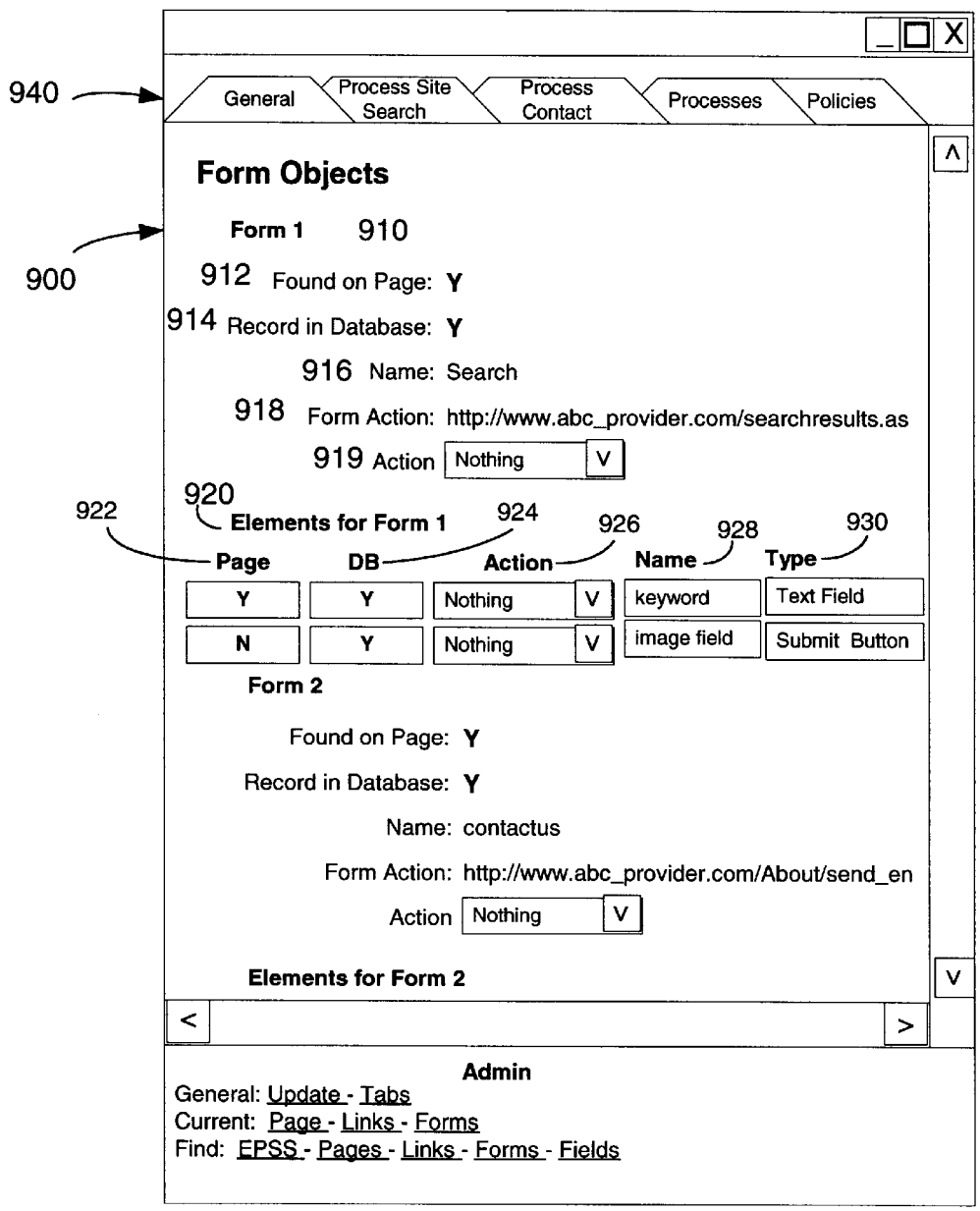
FIG. 9 is an example of a form objects window, according to an embodiment of the present invention.

FIG. 9 is an example of a form objects window, according to an embodiment of the present invention. The present invention may automatically scan an application (e.g., a page, multiple pages, a portion of a page, an entire application, or other application-defined section, etc.) to identify tagged objects and/or other elements of an application. The present invention may further determine whether existing content has been previously defined for an object and whether new content should be defined (or updated) for an object. Therefore, the present invention simplifies a process of associating content with objects or pages of a web-based application. FIG. 9 illustrates results of a scan of a page of an application, as shown in content window 900. As indicated in section 910, a form object with the name "search" as shown by 916 has been found on the page, as shown by 912. This object may have been stored in the database, as shown by 914. In addition, a form action may be described at 918. A form action represents an action taken by the web-based application when the user submits data to the application. The user may use a drop-down menu (or other user input), at 919 to save the object to the database, create a new object, delete the object from the database, modify the object and/or content in the database, or take no action (e.g., apply content found in the database). Other options may be available.

Elements associated with the object of Form 1 may be shown at section 920. Whether the elements are found on the page and the database are displayed in columns 922 and 924, respectively. A user may select an action from the drop-down menu at column 926. Element name and type may be shown in columns 928 and 930, respectively.

Tabs 940 may be defined and customized in the present invention. The information provided in the tabs may change dynamically depending on the page, object, or other element where the user's cursor is currently placed. A general tab may provide help/training content to a user for a page, an object, or other predefined element. A policy tab may provide page-level information, notes, and/or other information. Other tabs may be customized based on the type of application, type of user, and/or other factors. For example, if the application is a data-entry application, a tab may be provided for detailing data entry procedures. In addition, a content developer may use the present invention to deliver warnings and other information to users in real time. For example, if a company wants to recall a particular product or issue a warning, the company may provide a message that will appear in a content window when a user accesses the corresponding web-based application. Warning information may be provided as a tab or as an instant message box. Other graphics (e.g., icons, animation, etc.) may be implemented to display content and other information. In addition, sound (e.g., speech, music, etc.) as well as video may be used to convey content.

FIG. 10 is an example of a link objects window, according to an embodiment of the present invention. For example, the links objects window 1000 provides a listing of hyperlinks found on a page of a web-based application. Whether an object is found on a particular page is shown in column 1010. Whether the object exists in the database is shown in column 1012. A user action may be defined in column 1014, and a corresponding URL may be displayed in column 1016. Other information may be provided as well.

Figure 11:
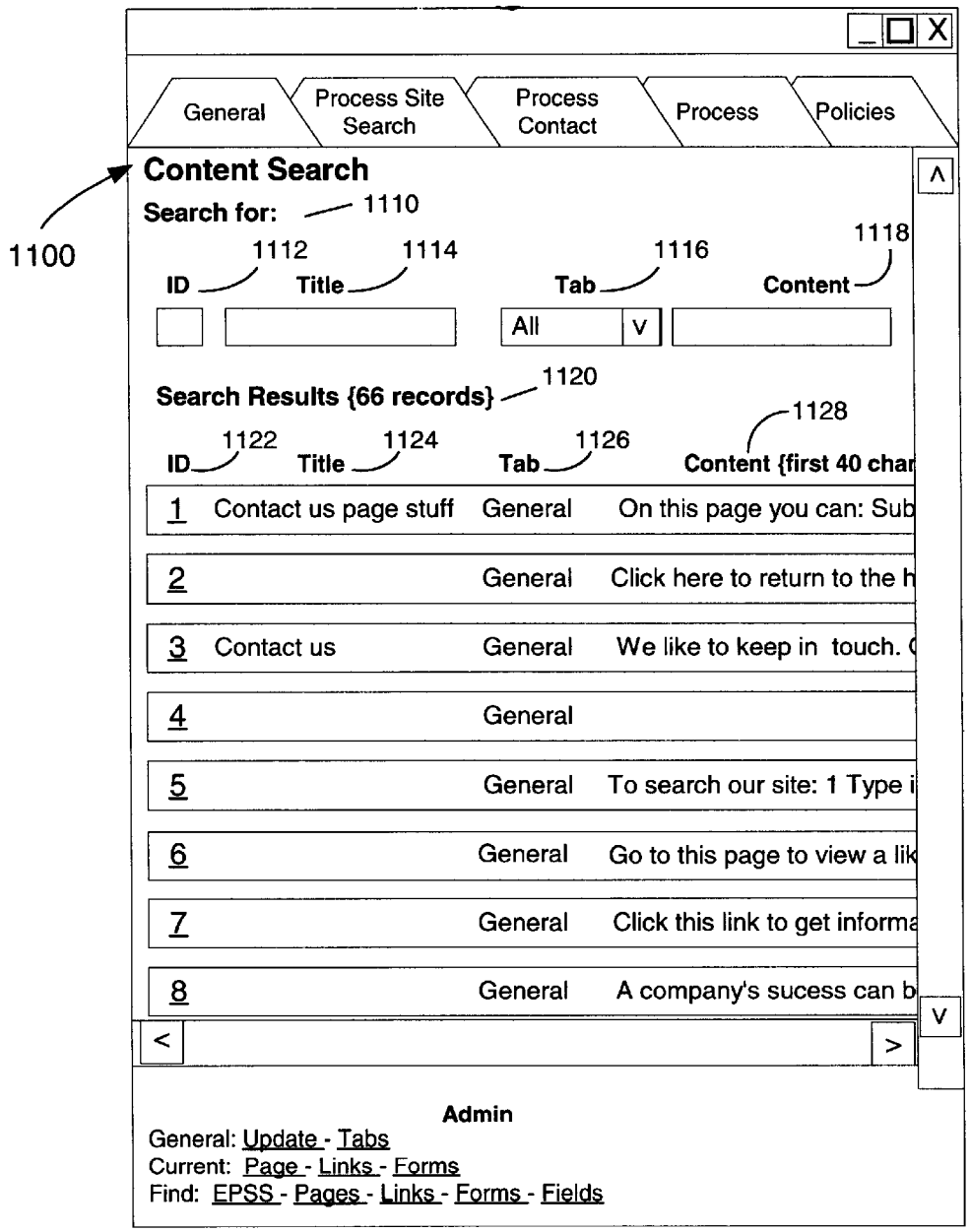
FIG. 11 is an example of a content search window, according to an embodiment of the present invention.

FIG. 11 is an example of a content search window, according to an embodiment of the present invention. Content search window 1100 may include Search 1110 and Search Results 1120. Search 1110 enables a user to search for a particular object or objects based on ID 1112, title 1114, tab 1116 and/or content 1118. In another example, user-defined search terms may be used. Search results 1120 may be displayed by ID 1122, title 1124, tab 1126 and/or content 1128.

The present invention may replace classroom instruction for many employees. Rather than spending a week in class to learn how to perform daily tasks, a new user may be able to run an application from the user's desk and have concurrent training, as the user is using the system.

With the present invention, a new user may be given instructions on how to start the application and the help/training tool of the present invention. From there, the present invention may provide step-by-step help on how to enter data, how to navigate through the system, and help on company policies and procedures. Thus, the new user may be productive from day one without classroom training.

The present invention provides additional benefits and features. As the present invention is web-delivered, content may be centrally served, updated and disseminated immediately without physical distribution of a knowledge base. Because the help/training content of the present invention may be customized, internal Subject Matter Experts may provide information that may become immediately available to application users. Internal knowledge may be made available to some or all users. In addition, the present invention content window may be branded for any customer, making it look as though it were developed in-house or especially for a specific audience. The present invention may work without any modifications to the application (as viewed by the end user) or assistance from the application vendor, provided the application is delivered using a tag-based language. The functionality of the application is unaffected by the presence of the content window. The application runs as if the help/training tool is not present.

Even if an application is presented in one language, the present invention window may be displayed in any language. Content can be developed for multiple languages supporting an application in a particular language. Therefore, the present invention may display a translation of terms and/or phrases corresponding to an object in a web-based application. According to another embodiment of the present invention, content may be delivered as sound, so instructions may be heard by the user.

The present invention may provide multiple levels of security. A first level of security may provide secure access to the help/training content for the purposes of viewing or modifying content. For example, users may be granted the right to add, change, or delete help/training content. In another example, users may only be able to view the content. Other privileges may be available and other restrictions may be applied. A second level of security may apply to the application and the associated help/training content. Since the content tracks with the application, the help/training content may mirror whatever security access to the application is in place. If end-users do not have access to a particular function, they will not see any training associated with that function.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method employed by a computer user for accessing help/training content associated with a web-based application for dynamically displaying help/training content associated with an object dynamically triggered in the web-based application, the method comprising the steps of:

accessing the web-based application presented in a tag-based language format in a first browser window through a proxy server wherein the web-based application outputs a tag-based page comprising at least one markup language tagged object;

wherein the proxy server receives the tag-based page from the web-based application; identifies the at least one tagged object and annotates the tag-based page to associate help/training content to the at least one tagged object; and wherein the proxy server further initiates a help/training tool associated with the web-based application wherein the help/training tool displays a separate second browser window for simultaneously displaying help/training content with the first browser window containing the web-based application;

dynamically triggering the at least one markup language tagged object in the tag-based page of the web-based application wherein the step of dynamically triggering the at least one markup language tagged object in the first browser window automatically invokes a simultaneous display of help/training content associated with the triggered markup language tagged object in the second browser window; and dynamically triggering a second markup language tagged object in the web-based application, wherein content in the second browser window is replaced with content associated with the second markup language tagged object;

wherein the web-based application as displayed to the user remains unchanged and wherein the web-based application and the help/training tool operate independently.

2. The method of claim 1, wherein the help/training content is interactive with the user.

3. The method of claim 1, wherein the help/training content comprises one or more of the following: instructions, policies, procedures and resources.

4. The method of claim 1, wherein the at least one markup language tagged object comprises one or more of the following: an input field, a drop-down menu, a button, a graphic and a hyperlink.

5. The method of claim 1, wherein the step of triggering the at least one markup language tagged object involves moving a cursor controlled by a user device over the at least one markup language tagged object.

6. The method of claim 1, wherein the web-based application is delivered using a tag-based markup language.

7. The method of claim 1, further comprising the steps of:
accessing a second web-based application; and
simultaneously viewing in the second browser window an associated help/training content for an object triggered in the second web-based application.

8. A method for providing content associated with at least one markup language tagged object in a web-based application provided to a user for simultaneous display in a separate browser page, the method comprising the steps of:
accessing the web-based application delivered in a tag-based language wherein the web-based application outputs a tag-based page comprising at least one markup language tagged object;
parsing the tag-based page of the web-based application to identify the at least one markup language tagged object prior to delivery to a user;
annotating the tag-based page to associate a content to the at least one markup language tagged object;
delivering the annotated tag-based page to the user;
storing the content associated with the at least one markup language tagged object in a database wherein the content is accessed when the at least one markup language tagged object is triggered by the user;
determining that the at least one markup language tagged object is triggered by the user in a first browser window displaying the web-based application;
retrieving the content associated with the triggered object from the database in response to the object being triggered in the first browser window; and
dynamically displaying the associated content to the user in a second browser window through a help/training tool for simultaneous display with the web-based application in the first browser window;
wherein the web-based application as displayed to the user remains unchanged and wherein the web-based application and the help/training tool operate independently.

9. The method of claim 8, wherein the content is customized for the user.

10. The method of claim 8, wherein the content corresponding to the at least one markup language tagged object is presented in a first language, wherein the first language is different from a second language used in the web-based application.

11. The method of claim 8, wherein the functionality of the web-based application as displayed to the user remains unchanged.

12. A method for providing content associated with a web-based application, the method comprising the steps of:
enabling a user to select a markup language tagged object in a tag-based page of the web-based application;
identifying a content record associated with the selected markup language tagged object, or, if none exists, creating a content record and associating the created content record with the selected markup language tagged object;
applying an action to the content record associated with the selected markup language tagged object;
storing the action applied to the content record in a database based on the action;
annotating the tag-based page for associating a content identified by the content record to the selected markup language tagged object; and
displaying the content associated with the selected markup language tagged object through a help/training tool wherein the content is simultaneously displayed in a content window in response to a trigger of an associated markup language tagged object in the web-based application displayed in a separate browser window;
wherein the web-based application as displayed to the user remains unchanged and wherein the web-based application and the help/training tool operate independently.

13. The method of claim 12, wherein the action comprises one or more of the following: save, create, delete and update.

14. A system employed by a computer user for accessing help/training content associated with a web-based application for dynamically displaying content associated with an object dynamically triggered in the web-based application, the system comprising:
a graphical user interface module for displaying in a first browser window the web-based application presented in a tag-based language format through a proxy server wherein the web-based application outputs a tag-based page comprising at least one markup language tagged object;
wherein the proxy server receives the tag-based page from the web-based application; identifies the at least one tagged object and annotates the tag-based page to associate help/training content to the at least one tagged object; and wherein the proxy server further initiates a help/training tool associated with the web-based application wherein the help/training tool displays a separate second browser window for simultaneous displaying content with the first browser window containing the web-based application; and
a user device for dynamically triggering the at least one markup language tagged object in the tag-based page of the web-based application wherein the step of dynamically triggering the at least one markup language tagged object in the first browser window automatically invokes a simultaneous display of help/training content associated with the triggered markup language tagged object; and for dynamically triggering a second markup language tagged object in the web-based application, wherein the second markup language tagged object is triggered and content in the second browser window is replaced with content associated with the second markup language tagged object;
wherein the web-based application as displayed to the user remains unchanged and wherein the web-based application and the help/training tool operate independently.

15. The system of claim 12, wherein the help/training content is interactive with the user.

16. The system of claim 12, wherein the help/training content comprises one or more of the following: instructions, policies, procedures and resources.

17. The system of claim 12, wherein the at least one markup language tagged object comprises one or more of the following: an input field, a drop-down menu, a button, a graphic and a hyperlink.

18. The system of claim 12, wherein triggering the at least one markup language tagged object involves moving a cursor controlled by the user device over the at least one markup language tagged object.

19. The system of claim 12, wherein the web-based application is delivered using a tag-based markup language.

20. The system of claim 12, wherein a second web-based application is supported where an associated help/training content for an object triggered in the second web-based application is simultaneously viewed in the second browser window.

21. A system for providing content associated with at least one markup language tagged object in a web-based application provided to a user for simultaneous display in a separate browser page, the system comprising:

- a parser for parsing a tag-based page of the web-based application comprising at least one markup language tagged object to identify the at least one markup language tagged object in a tag-based language prior to delivery to a user;
- a server for annotating the tag-based page to associate a content to the at least one markup language tagged object and delivering the annotated tag-based page to the user; and
- a database for storing the content associated with the at least one markup language tagged object wherein the content is accessed when the at least one markup language tagged object is triggered by the user;
- a content server for retrieving the content associated with the triggered object from the database in response to the at least one markup language tagged object being triggered by the user in a first browser window displaying the web-based application; and
- a graphical user interface module for dynamically displaying in a separate browser window through a help/training tool the associated content to the user for simultaneous display with the web-based application in the first browser window;
- wherein the web-based application as displayed to the user remains unchanged and wherein the web-based application and the help/training tool operate independently.

22. The system of claim 21, wherein the content is customized for the user.

23. The system of claim 25, wherein the content corresponding to the at least one markup language tagged object is presented in a first language, wherein the first language is different from a second language used in the web-based application.

24. The system of claim 21, wherein the functionality of the web-based application as displayed to the user remains unchanged.

* * * * *

UNITED STATES PATENT AND TRADEMARK OFFICE
CERTIFICATE OF CORRECTION

PATENT NO. : 6,687,485 B2
DATED : February 3, 2004
INVENTOR(S) : Rosalie Marie Hopkins, Sara Elizabeth Chodrow and Kevin Rory Danner It is certified that error appears in the above-identified patent and that said Letters Patent is hereby corrected as shown below:

<u>Title page,</u>
Item [73], Assignee, should read -- ThinkSmart Performance Systems LLC --

Signed and Sealed this

Eleventh Day of May, 2004

JON W. DUDAS
*Acting Director of the United States Patent and Trademark Office*